United States Patent
Paithane et al.

(10) Patent No.: US 10,581,879 B1
(45) Date of Patent: Mar. 3, 2020

(54) ENHANCED MALWARE DETECTION FOR GENERATED OBJECTS

(71) Applicant: FireEye, Inc., Milpitas, CA (US)

(72) Inventors: Sushant Paithane, Maharashtra (IN); Sai Omkar Vashisht, Milpitas, CA (US)

(73) Assignee: FireEye, Inc., Milpitas, CA (US)

( * ) Notice: Subject to any disclaimer, the term of this patent is extended or adjusted under 35 U.S.C. 154(b) by 35 days.

(21) Appl. No.: 15/627,270

(22) Filed: Jun. 19, 2017

Related U.S. Application Data

(60) Provisional application No. 62/438,338, filed on Dec. 22, 2016.

(51) Int. Cl.
*H04L 29/06* (2006.01)
*G06F 9/455* (2018.01)

(52) U.S. Cl.
CPC ...... *H04L 63/1416* (2013.01); *G06F 9/45533* (2013.01)

(58) Field of Classification Search
CPC ...... G06F 9/45533; G06F 9/455; G06F 9/465; G06F 9/54; G06F 21/56; H04L 63/145; H04L 63/1416; H04L 41/0233; H04L 29/06
USPC ................ 719/315–316; 718/1; 726/22–25
See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,319,776 A | 6/1994 | Hile et al. | |
| 5,440,723 A | 8/1995 | Arnold et al. | |
| 5,490,249 A | 2/1996 | Miller | |
| 5,657,473 A | 8/1997 | Killean et al. | |
| 5,802,277 A | 9/1998 | Cowlard | |
| 5,842,002 A | 11/1998 | Schnurer et al. | |

(Continued)

FOREIGN PATENT DOCUMENTS

| GB | 2439806 A | 1/2008 |
|---|---|---|
| GB | 2490431 A | 10/2012 |

(Continued)

OTHER PUBLICATIONS

David French, "Fuzzy Hashing Against Different Types of Malware", Oct. 24, 2011, SEI Insights. (Year: 2011).*

(Continued)

*Primary Examiner* — Saleh Najjar
*Assistant Examiner* — Khalid M Almaghayreh
(74) *Attorney, Agent, or Firm* — Rutan & Tucker, LLP

(57) ABSTRACT

A computerized method to identify malicious code generated by seemingly benign objects is described. The generated malware detection system described identifies generated objects (code) and analyzes each generated object to collect features which may be associated with maliciousness. The analysis may determine if an Abstract Syntax Tree (AST) representation of the generated object is correlated with known malware ASTs. Correlation of the features identified during processing of the generated objects, including the sequences of generated object, may be used in classifying the object as malicious. The malware detection system may communicate with the one or more endpoint devices to influence detection and reporting of behaviors and malware by those device(s).

22 Claims, 4 Drawing Sheets

(56) References Cited

U.S. PATENT DOCUMENTS

| | | |
|---|---|---|
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |

(56) References Cited

U.S. PATENT DOCUMENTS

| | | | |
|---|---|---|---|
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,893,294 B1 * | 11/2014 | Steele, III ............ G06F 16/9574 726/26 |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,081,961 B2 * | 7/2015 | Yermakov ............ H04L 63/0227 |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,128,728 B2 * | 9/2015 | Siman ..................... G06F 8/433 |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,792,443 B1 * | 10/2017 | Sheridan ............... G06F 21/577 |
| 9,805,203 B2 * | 10/2017 | Johns .................... G06F 21/577 |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 * | 11/2017 | Gomez ............... H04L 63/1416 |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |

(56) References Cited

U.S. PATENT DOCUMENTS

| | | |
|---|---|---|
| 9,946,568 B1 | 4/2018 | Ismael et al. |
| 9,954,890 B1 | 4/2018 | Staniford et al. |
| 9,973,531 B1 | 5/2018 | Thioux |
| 9,992,025 B2 * | 6/2018 | Mahaffey .................. G06F 8/70 |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B2 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0016953 A1 * | 1/2007 | Morris .................... G06F 21/56 726/24 |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |

(56) References Cited

U.S. PATENT DOCUMENTS

| | | |
|---|---|---|
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1* | 5/2010 | Staniford ............ H04L 63/1416 726/25 |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047618 A1* | 2/2011 | Evans ................... G06F 21/566 726/23 |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0179484 A1* | 7/2011 | Tuvell ................... G06F 21/56 726/22 |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |

(56) References Cited

U.S. PATENT DOCUMENTS

| | | | |
|---|---|---|---|
| 2012/0110667 A1 | 5/2012 | Zubrilin et al. | |
| 2012/0117652 A1 | 5/2012 | Manni et al. | |
| 2012/0121154 A1 | 5/2012 | Xue et al. | |
| 2012/0124426 A1 | 5/2012 | Maybee et al. | |
| 2012/0174186 A1 | 7/2012 | Aziz et al. | |
| 2012/0174196 A1 | 7/2012 | Bhogavilli et al. | |
| 2012/0174218 A1 | 7/2012 | McCoy et al. | |
| 2012/0198279 A1 | 8/2012 | Schroeder | |
| 2012/0210423 A1 | 8/2012 | Friedrichs et al. | |
| 2012/0216280 A1* | 8/2012 | Zorn | G06N 7/005 726/23 |
| 2012/0222121 A1 | 8/2012 | Staniford et al. | |
| 2012/0255015 A1 | 10/2012 | Sahita et al. | |
| 2012/0255017 A1 | 10/2012 | Sallam | |
| 2012/0260304 A1* | 10/2012 | Morris | G06F 21/56 726/1 |
| 2012/0260342 A1 | 10/2012 | Dube et al. | |
| 2012/0266244 A1* | 10/2012 | Green | G06F 21/566 726/24 |
| 2012/0278886 A1 | 11/2012 | Luna | |
| 2012/0297489 A1 | 11/2012 | Dequevy | |
| 2012/0330801 A1 | 12/2012 | McDougal et al. | |
| 2012/0331553 A1 | 12/2012 | Aziz et al. | |
| 2013/0014259 A1 | 1/2013 | Gribble et al. | |
| 2013/0036472 A1 | 2/2013 | Aziz | |
| 2013/0047257 A1 | 2/2013 | Aziz | |
| 2013/0074185 A1 | 3/2013 | McDougal et al. | |
| 2013/0086684 A1 | 4/2013 | Mohler | |
| 2013/0097699 A1 | 4/2013 | Balupari et al. | |
| 2013/0097706 A1 | 4/2013 | Titonis et al. | |
| 2013/0111587 A1 | 5/2013 | Goel et al. | |
| 2013/0117852 A1 | 5/2013 | Stute | |
| 2013/0117855 A1 | 5/2013 | Kim et al. | |
| 2013/0139264 A1 | 5/2013 | Brinkley et al. | |
| 2013/0160125 A1 | 6/2013 | Likhachev et al. | |
| 2013/0160127 A1 | 6/2013 | Jeong et al. | |
| 2013/0160130 A1 | 6/2013 | Mendelev et al. | |
| 2013/0160131 A1 | 6/2013 | Madou et al. | |
| 2013/0167236 A1 | 6/2013 | Sick | |
| 2013/0174214 A1 | 7/2013 | Duncan | |
| 2013/0185789 A1 | 7/2013 | Hagiwara et al. | |
| 2013/0185795 A1 | 7/2013 | Winn et al. | |
| 2013/0185798 A1 | 7/2013 | Saunders et al. | |
| 2013/0191915 A1 | 7/2013 | Antonakakis et al. | |
| 2013/0196649 A1 | 8/2013 | Paddon et al. | |
| 2013/0227691 A1 | 8/2013 | Aziz et al. | |
| 2013/0246370 A1 | 9/2013 | Bartram et al. | |
| 2013/0247186 A1 | 9/2013 | LeMasters | |
| 2013/0263260 A1 | 10/2013 | Mahaffey et al. | |
| 2013/0291109 A1 | 10/2013 | Staniford et al. | |
| 2013/0298243 A1 | 11/2013 | Kumar et al. | |
| 2013/0318038 A1 | 11/2013 | Shiffer et al. | |
| 2013/0318073 A1 | 11/2013 | Shiffer et al. | |
| 2013/0325791 A1 | 12/2013 | Shiffer et al. | |
| 2013/0325792 A1 | 12/2013 | Shiffer et al. | |
| 2013/0325871 A1 | 12/2013 | Shiffer et al. | |
| 2013/0325872 A1 | 12/2013 | Shiffer et al. | |
| 2014/0032875 A1 | 1/2014 | Butler | |
| 2014/0053260 A1 | 2/2014 | Gupta et al. | |
| 2014/0053261 A1 | 2/2014 | Gupta et al. | |
| 2014/0130158 A1 | 5/2014 | Wang et al. | |
| 2014/0137180 A1 | 5/2014 | Lukacs et al. | |
| 2014/0157407 A1* | 6/2014 | Krishnan | G06F 21/50 726/22 |
| 2014/0169762 A1 | 6/2014 | Ryu | |
| 2014/0179360 A1 | 6/2014 | Jackson et al. | |
| 2014/0181131 A1 | 6/2014 | Ross | |
| 2014/0189687 A1 | 7/2014 | Jung et al. | |
| 2014/0189866 A1 | 7/2014 | Shiffer et al. | |
| 2014/0189882 A1 | 7/2014 | Jung et al. | |
| 2014/0237600 A1 | 8/2014 | Silberman et al. | |
| 2014/0280245 A1 | 9/2014 | Wilson | |
| 2014/0283037 A1 | 9/2014 | Sikorski et al. | |
| 2014/0283063 A1 | 9/2014 | Thompson et al. | |
| 2014/0328204 A1 | 11/2014 | Klotsche et al. | |
| 2014/0337836 A1 | 11/2014 | Ismael | |
| 2014/0344926 A1 | 11/2014 | Cunningham et al. | |
| 2014/0351935 A1 | 11/2014 | Shao et al. | |
| 2014/0380473 A1 | 12/2014 | Bu et al. | |
| 2014/0380474 A1 | 12/2014 | Paithane et al. | |
| 2015/0007312 A1 | 1/2015 | Pidathala et al. | |
| 2015/0067839 A1* | 3/2015 | Wardman | G06F 16/9566 726/22 |
| 2015/0096022 A1 | 4/2015 | Vincent et al. | |
| 2015/0096023 A1 | 4/2015 | Mesdaq et al. | |
| 2015/0096024 A1 | 4/2015 | Haq et al. | |
| 2015/0096025 A1 | 4/2015 | Ismael | |
| 2015/0180886 A1 | 6/2015 | Staniford et al. | |
| 2015/0186645 A1 | 7/2015 | Aziz et al. | |
| 2015/0199513 A1 | 7/2015 | Ismael et al. | |
| 2015/0199531 A1 | 7/2015 | Ismael et al. | |
| 2015/0199532 A1 | 7/2015 | Ismael et al. | |
| 2015/0220735 A1 | 8/2015 | Paithane et al. | |
| 2015/0363598 A1* | 12/2015 | Xu | G06F 21/563 726/23 |
| 2015/0372980 A1 | 12/2015 | Eyada | |
| 2016/0004869 A1 | 1/2016 | Ismael et al. | |
| 2016/0006756 A1 | 1/2016 | Ismael et al. | |
| 2016/0044000 A1 | 2/2016 | Cunningham | |
| 2016/0094572 A1* | 3/2016 | Tyagi | H04L 63/1425 726/23 |
| 2016/0127393 A1 | 5/2016 | Aziz et al. | |
| 2016/0191547 A1 | 6/2016 | Zafar et al. | |
| 2016/0191550 A1 | 6/2016 | Ismael et al. | |
| 2016/0253500 A1* | 9/2016 | Alme | H05K 999/99 726/23 |
| 2016/0261612 A1 | 9/2016 | Mesdaq et al. | |
| 2016/0285914 A1 | 9/2016 | Singh et al. | |
| 2016/0301703 A1 | 10/2016 | Aziz | |
| 2016/0330219 A1* | 11/2016 | Hasan | H04L 63/1408 |
| 2016/0335110 A1 | 11/2016 | Paithane et al. | |
| 2017/0083703 A1 | 3/2017 | Abbasi et al. | |
| 2018/0013770 A1 | 1/2018 | Ismael | |
| 2018/0048660 A1 | 2/2018 | Paithane et al. | |
| 2018/0121316 A1 | 5/2018 | Ismael et al. | |
| 2018/0288077 A1 | 10/2018 | Siddiqui et al. | |

FOREIGN PATENT DOCUMENTS

| | | |
|---|---|---|
| WO | 02/006928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

Venezia, Paul , "NetDetector Captures Intrusions", InfoWorld Issue 27, ("Venezia"), (Jul. 14, 2003).

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

(56) References Cited

OTHER PUBLICATIONS

Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Mining Specification of Malicious Behavior"—Jha et al, UCSB, Sep. 2007 https://www.cs.ucsb.edu/.about.chris/research/doc/esec07.sub.--mining.pdf-.
"Network Security: NetDetector—Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xpl/articleDetails.isp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Approach to Trusted Virtualized Systems (Feb. 2, 2005) ("Sailer").

(56) References Cited

OTHER PUBLICATIONS

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham, "Insertion, Evasion, and Denial of Service: Eluding Network Intrusion Detection", Secure Networks, ("Ptacek"), (Jan. 1998).

* cited by examiner

US 10,581,879 B1

ENHANCED MALWARE DETECTION FOR GENERATED OBJECTS

CROSS-REFERENCE TO RELATED APPLICATIONS

This application claims the benefit of priority on U.S. Provisional Application No. 62/438,338 filed Dec. 22, 2016, the entire contents of which are incorporated by reference herein.

FIELD

Embodiments of the invention relate generally to cyber security and more particularly to enhancing detection of malware.

BACKGROUND

Computer security and the prevention of cyber-attacks has become an important service for enterprises. Cyber-attacks may employ malicious software, delivered via a public network connection, to exploit a target computer or an enterprise network and execute malicious activity on the target. The malware may be designed by the malware author to evade detection.

Conventional network-based malware detection systems may monitor and analyze network content received, via a network connection, to determine if the content should be deemed malware. These conventional systems may use malicious signature databases to match content with known malware as well as static analysis engines and dynamic analysis engines to determine if the network content is malicious. A static analysis engine may scan the received network content and determine if characteristics of the content may be correlated with those of malware. Similarly, the dynamic analysis engine may process (e.g. execute) the network content in a virtualized computing engine, which may mimic one or more devices on the monitored network to identify malicious behaviors observed during processing which may be correlated with those of malware. Some systems may combine the correlations of a number of engines to classify the analyzed network content as malicious.

These conventional analysis techniques may also generate false negatives when the network content, delivered through the monitored network connection is configured to cloak malicious activities. It is desirable to provide enhanced detection techniques to avoid false negatives.

BRIEF DESCRIPTION OF THE DRAWINGS

Embodiments of this disclosure are illustrated by way of example and not by way of limitation in the figures of the accompanying drawings, in which like references indicate similar elements and in which.

DETAILED DESCRIPTION

Figure 1:
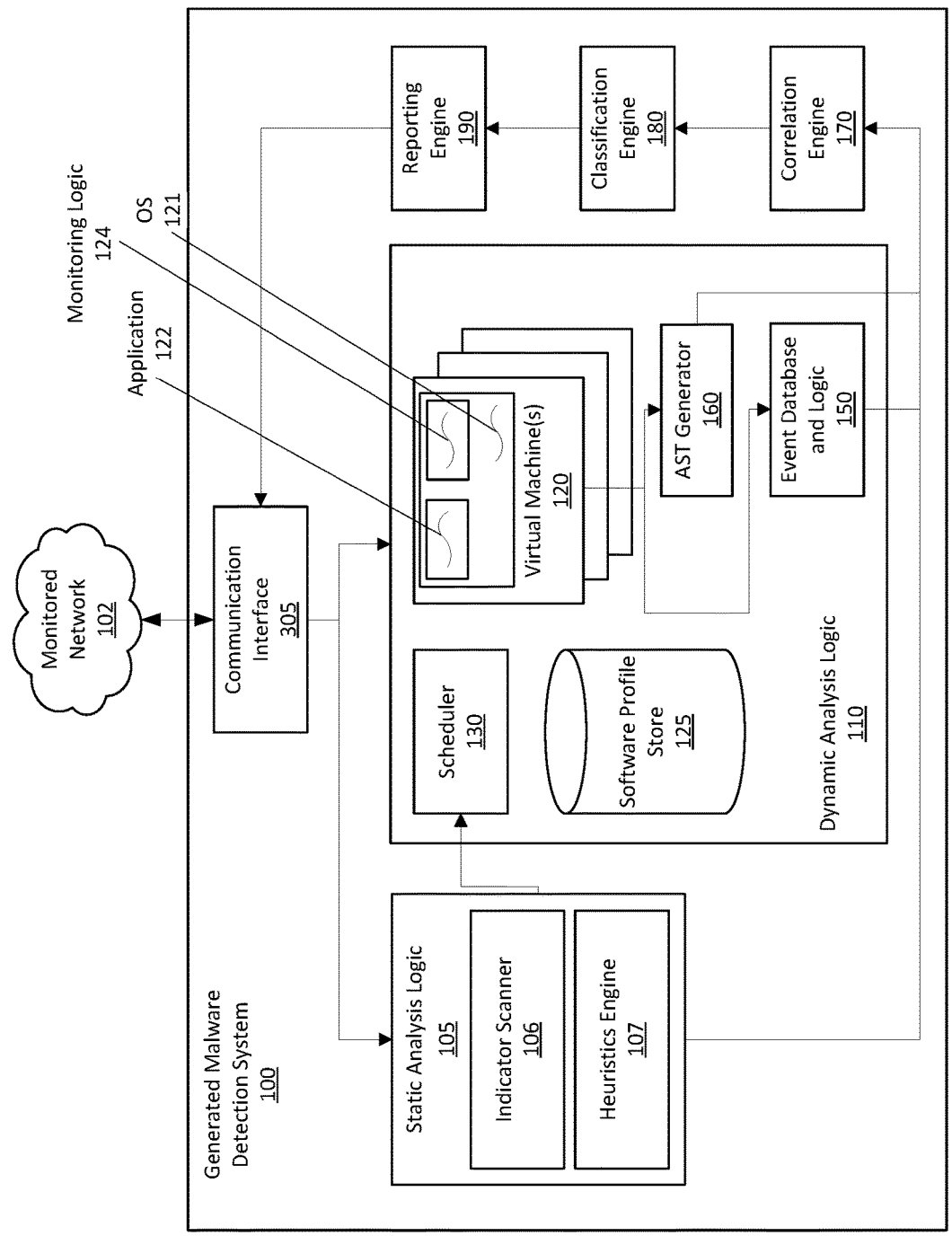
FIG. 1 is an exemplary block diagram of an architecture comprising a malware detection system and a generated malware detection system, including one or more virtual machine(s) coupled to an event database and logic, AST generator, a correlation engine, a classification engine, and a reporting engine.

A malware detection system (MDS) and method identifies a cyber-security attack by processing an object received by the system and analyzing the features of the received object and any objects generated or spawned in response to processing the original, received object, to assess if the features of any of these objects are associated with those of malware. The generation of additional objects during such processing of the original object (or a previously generated additional object) may in itself be a feature of potential maliciousness, although not dispositive of maliciousness. By determining a generated object is malicious, the malware detection system may, by inference, determine that the original object is malicious and that a cyber-security attack is under way.

Embodiments of the invention perform an analysis relying, at least in part, on a syntax tree representation, such as an Abstract Syntax Tree (AST), generated for each object. An AST is a tree representation of the abstract syntactic structure of human-readable source code. The source code may be a script written in a scripting programming language such as JavaScript® or ActionScript®. Each node of the tree denotes a construct occurring in the source code. The syntax in an AST is "abstract" in not representing every detail appearing in the real syntax. In representing the structure of program code (e.g., script) without its low-level details, the AST facilitates program analysis and comparison of its key features with those of other scripts, including those constituting known malware. The syntax tree representation may take other forms as well, depending on the embodiment, such as a concrete syntax tree (e.g., parse tree), as will be apparent to those of skill in this art, however, the syntax tree will be referred to herein as an AST for convenience. Moreover, the generated objects of interest herein include, without limitation, those that require compiling, such as just-in-time compiling, during runtime, such as objects comprising scripts.

More specifically, each of the original and the one or more associated generated objects, is statically scanned to identify its characteristics, is executed or otherwise processed in a run-time environment established by a virtual machine to capture its runtime behaviors, and its AST is analyzed to identify additional features relevant to a determination of maliciousness based on machine learning and experiential knowledge. The analysis correlates these features of the original and associated generated objects with those of known malware to determine a probability of maliciousness. In some embodiments, the features of the original and associated generated objects may be correlated with the features of known malicious objects on an object-by-object basis (that is, each of the original and associated generated objects correlated separately with those of known malware and benign objects). In some embodiments, the combined features of the original and associated generated objects may be correlated with those of known malware that conducts a cyber-security attack via plural objects (e.g., an original malware kit and one or more "dropped" or generated objects). In some embodiments, the combined feature set is only correlated when the object-by-object analysis results are inconclusive.

The correlation may be performed by a single correlation engine, which determines a probability of maliciousness that, if in excess of a threshold, results in classification of the original object as malicious and generation of an alert of a cyber-security attack. In some embodiments, the correlation engine may operate as two separate units, a first unit dedicated to the correlation of features determined by analysis of the ASTs for all the objects under test with those determined by analysis of ASTs of known malicious and/or benign objects, the second unit correlating the static and behavioral features with those known malicious and/or benign objects, and the then resulting probabilities of both are combined and compared with a threshold. In another embodiment, the correlation engine may operate as two separate units. In this case, a first unit is dedicated to correlation of features of original objects and the second is dedicated to correlation of features of the generated objects, and then the resulting probabilities of both are combined and compared with a threshold.

In some embodiments, the malware detection system and method may identify behaviors of each of the objects (including the generation of additional objects) during processing in a virtual machine (VM), the virtual machine configured with monitoring logic, an operating system, and one or more computer applications. The monitoring logic of the VM may, during processing of an object (either the original object or a generated object), identify when a new or additional object is generated, the generation of the additional object being identified as a behavioral feature associated with the processed object. Then, each of the generated objects is also processed in the VM and its behaviors monitored and captured. This may continue in an iterative process as additional objects are generated. The behaviors detected by the monitoring logic are features associated with the object being processed.

The malware detection system may include AST analysis logic which generates an AST for each original object and associated generated object. In some embodiments, the AST analysis logic correlates the AST features of each of the objects with the AST features of known labelled objects (the previously labelled objects being classified and confirmed as either "malicious" or "benign" based on machine learning and experiential knowledge). In other embodiments the AST analysis logic may perform an analysis separately on the AST features of each generated object, and then perform the analysis on a combined set of AST features for all the original and associated generated objects.

In some embodiments, the MDS may process the original, received object and identify, capture and analyze any associated generated objects. In other embodiments, the MDS may be separate from a generated malware detection system ("GMDS"). In these embodiments, the MDS provides the generated objects its captures during processing to the GMDS, which may be operationally integrated with the MDS, and either locally (but separately) or remotely located, and connected via a communication link or a network to the MDS. The GMDS is responsible for analyzing the generated objects.

I. Terminology

In the following description, certain terminology is used to describe features of the invention. For example, in certain situations, the term "logic" may be representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

The term "process" may include an instance of a computer program (e.g., a collection of instructions, also referred to herein as an application). In one embodiment, the process may be comprised of one or more threads executing concurrently (e.g., each thread may be executing the same or a different instruction concurrently).

The term "processing" may include execution of a binary or script, or launching an application in which an object is processed, wherein launching should be interpreted as placing the application in an open state and, in some implementations, performing simulations of actions typical of human interactions with the application. For example, the application, an internet browsing application, may be processed such that the application is opened and actions such as "visiting" a website, downloading website pages, scrolling the website page, and activating a link from the website are performed.

An "interpreter" is a software component that is configured to interpret and execute objects (e.g. often called bytecode) which is not native to an operating system for the electronic device targeted to receive the object, but features a higher level construct. The interpreter typically translates the higher level code (e.g., command lines from an interpreted JavaScript®, etc.) in the context of a corresponding application. For ease of deployment, when an electronic device is implemented with a particular interpreter, content within a received file is commonly translated from non-native to native code. The bytecode instructions or higher-level language code are typically translated without any consideration that the object may be malicious. Thereafter, after being interpreted (i.e. converted from non-native to native code for execution), the object is processed.

The term "object" generally refers to a collection of data, whether in transit (e.g., over a network) or at rest (e.g., stored), often having a logical structure or organization that enables it to be categorized or typed for purposes of analysis. During analysis, for example, the object may exhibit a set of expected and/or unexpected characteristics and, during processing, a set of expected and/or unexpected behaviors, which may evidence the presence of malware and potentially allow the object to be categorized or typed as malware. For example, an unexpected behavior of an object may include the generation of additional objects by an object being processed. In one embodiment, an object may include a binary file that may be executed within a virtual machine. Herein, the terms "binary file" and "binary" will be used interchangeably.

The term "feature" may be understood to refer, collectively, to the characteristics of an object that may be detected statically and the behaviors manifested in response to the processing of the object. Characteristics may include information about the object captured without requiring execution or "running" of the object. For example, characteristics may include metadata associated with the object, including, anomalous formatting or structuring of the object. Features may also include behaviors, where behaviors include information about the object and its activities captured during its execution or processing. Behaviors may include, but are not limited to, attempted outbound communications over a network connection or with other processes (e.g. the operating system, etc.), patterns of activity or inactivity, and/or attempts to access system resources.

The term "network device" may be construed as any intelligent electronic device with the capability of connecting to a network. Such a network may be a public network such as the internet or a private network such as a wireless data telecommunication network, wide area network, a type of local area network (LAN), or a combination of networks. Examples of a network device may include, but are not limited or restricted to, a laptop, a mobile phone, a tablet, etc.

The term "malicious" may represent a probability (or level of confidence) that the object is associated with a malicious attack or known vulnerability. For instance, the probability may be based, at least in part, on (i) pattern matches; (ii) analyzed deviations in messaging practices set forth in applicable communication protocols (e.g., HTTP, TCP, etc.) and/or proprietary document specifications (e.g., Adobe PDF document specification); (iii) analyzed compliance with certain message formats established for the protocol (e.g., out-of-order commands); (iv) analyzed header or payload parameters to determine compliance, (v) attempts to communicate with external servers during processing in one or more VMs, (vi) attempts to access, without the appropriate permissions, memory allocated for the application during processing, and/or (vii) other factors (including those noted elsewhere herein) that may evidence unwanted or malicious activity.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

A. Generated Malware Detection System

FIG. 1 is an exemplary block diagram of an exemplary architecture of a generated malware detection system 100 (GMDS) connected to a monitored network 102. The GMDS 100 comprises at least a dynamic analysis logic 110 and, in some embodiments, may also comprise a static analysis logic 105. In some embodiments the dynamic analysis logic 110 may further comprise at least one or more virtual machine(s) 120, each virtual machine configured with an operating system 121 (OS), one or more applications 122, and monitoring logic 124. Still further embodiments of the GMDS may also comprise a scheduler 130 and profile store 125.

Figure 3:
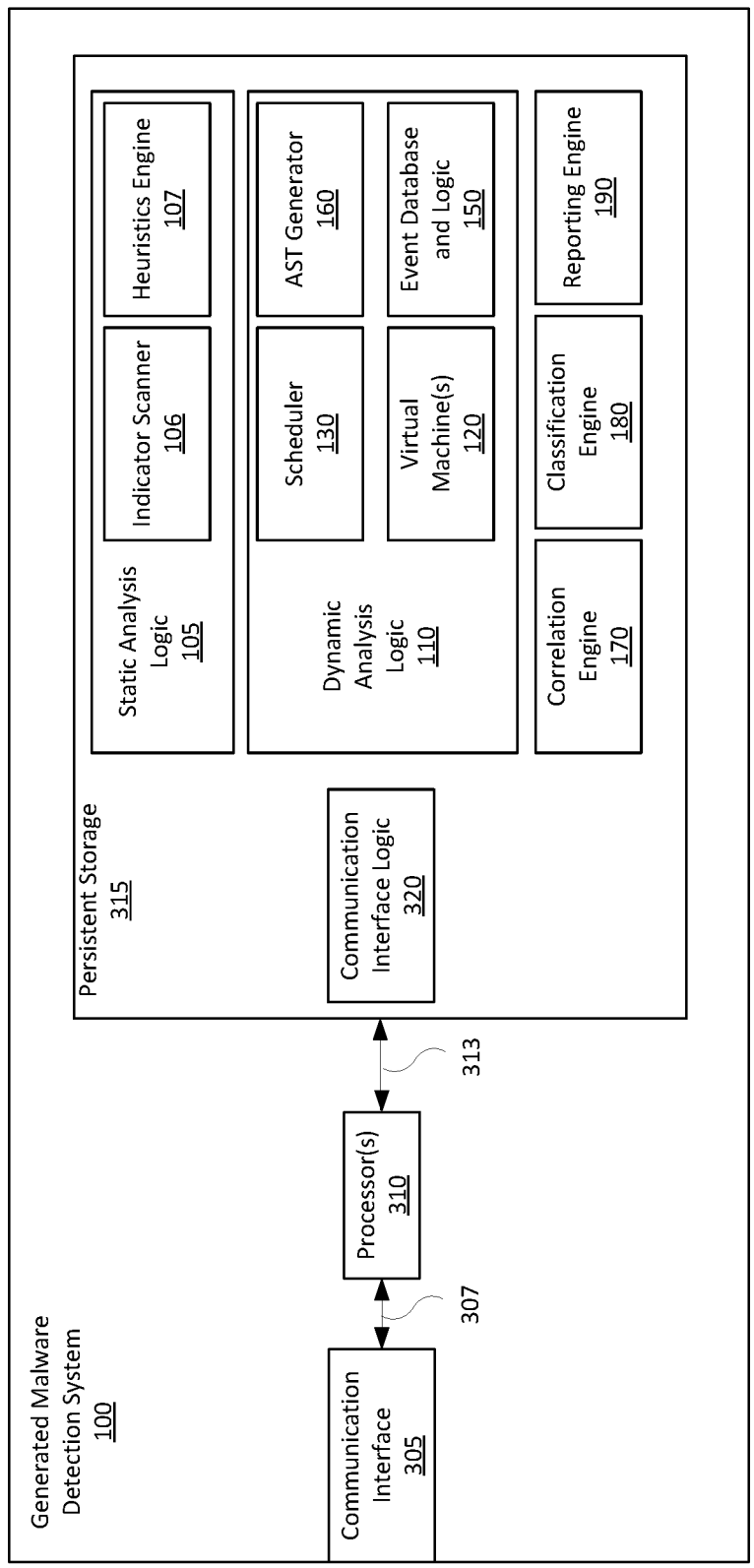
FIG. 3 is an exemplary embodiment of a logical representation of the generated malware detection system of FIG. 1.

Generally speaking, the generated malware detection system 100 may be implemented as one or more network-connected electronic devices, where each includes physical hardware comprising hardware processor(s), network interface(s), a memory, a system interconnect, an optional user interface as shown in FIG. 3. Accordingly, each of the components of the generated malware detection system 100 shown in FIG. 1 and described below may be implemented as one or more computer programs or modules executable on one or more processors and stored in memory.

The GMDS 100 receives objects for analysis via the communication interface 305 and determines if the received object is suspicious. In some embodiments, the GMDS may analyze the objects using a static analysis logic 105 configured to extract characteristics of the object and determine if the object is suspicious by scanning for known patterns or characteristics and/or representations of machine code identified as correlating with the features of malware. If the static analysis logic determines the object is suspicious (definitively neither "benign" nor "malicious"), the static analysis logic may provide the suspicious object to a scheduler 130 of the dynamic analysis logic 110 for further analysis.

The static analysis logic 105 may comprise an indicator scanner 106 which receives features associated with each object and compares it with unique identifiers. The unique identifiers are each associated with a previously encountered object know to be "benign" or "malicious". In some embodiments, the indicator scanner 106 may be configured with a whitelist (identifiers determined to be benign) and a blacklist (identifiers determined to be malicious). The indicator scanner 106 may effect a comparison by generating the unique identifier of the object from a hash of its machine code or other characteristics of the object and comparing the hash to the labelled hashes (e.g. of a set of known malicious or benign objects). In some embodiments, if the object is deemed suspicious and/or cannot be determined to be either benign or malicious, the static analysis logic may direct continued processing of the object by the heuristics engine 107 of the static analysis logic 105.

The heuristics engine 107 associates characteristics of the objects, such as formatting or patterns of the content, and uses such characteristics to determine a probability of maliciousness. The heuristics engine 107 applies heuristic rules and/or probability analysis to determine if the objects might contain or constitute malware. Heuristics engine 107 is adapted for analysis of an object to determine whether it satisfies a rule or corresponds to a particular malware pattern. Heuristics rules are distinct from indicators as they are not generated to represent a particular malicious object, but the characteristic properties of an object. The heuristics engine 107 may then assign a probability to the results, often well less than 100%, which indicates whether an object is malicious. The identifiers may represent identified characteristics (features) of the potential malware. The heuristics engine 107 may create an identifier associated with one or more characteristics of the object by generating a hash of the characteristics. The heuristics engine 107 may include a scoring logic to correlate one or more characteristics of potential malware with a score of maliciousness, the score indicating the level of suspiciousness and/or maliciousness of the object. If the heuristics engine 107 determines that the maliciousness score exceeds a suspiciousness threshold but does not exceed a maliciousness threshold, the static analysis logic 105 will identify the object as suspicious and provide the object to the scheduler 130 for further analysis by the dynamic analysis logic 110.

The generated malware detection system 100 includes at least a dynamic analysis logic 110, a correlation engine 170, a classification engine 180, and a reporting logic 190. The dynamic analysis logic 110 includes one or more virtual machine(s) 120, a software profile store 125, a scheduler 130, an event database and logic 150, and an AST generator 160. Each virtual machine containing an operating system 121, one or more applications 122, and a monitoring logic 124 to intercept activities of the one or more applications. In some embodiments the scheduler 130 is configured to receive an object, from the static analysis logic 105, to be scheduled for processing by the one or more virtual machines 120. The object may be provided to the system with metadata indicating the object has been identified by a prior analysis as suspicious. In other embodiments the scheduler 130 may be configured to process received objects based on the available processing resources of the generated malware detection system.

The scheduler 130 is responsible for provisioning and instantiating a virtual machine 120 to execute the object at a schedule time. The scheduler 130 may receive suspicious objects from the malware detection system 105 for analysis in the virtual machine 120. In some embodiments, the scheduler may receive metadata associated with the object to be processed identifying a destination device to the scheduler 130. The scheduler may use network resources to identify a software profile similar to the destination device. The scheduler 130 may then provision one or more virtual machine(s) 120 with a software profile (operating system (OS) 121 and one or more applications 122) retrieved from the software profile store 125 and other components appropriate for execution of the object. A virtual machine is executable software that is configured to mimic the performance of a device (e.g., the destination device).

The scheduler 130 can configure the virtual machine to mimic the performance characteristics of a destination device that are pertinent for behavioral monitoring for malware detection. The virtual machine 120 can be provisioned from the store of software profiles 125. In one example, the scheduler 130 configures the characteristics of the virtual machine to mimic only those features (which include statically detected characteristics and dynamically monitored behaviors) that are affected by an object to be executed (opened, loaded, and/or executed) and analyzed. Such features can include ports that are to receive the network data, select device drivers that are to respond to the network data and any other devices that could be coupled to or contained within a device that can respond to the network data.

The store of software profiles 125 is configured to store virtual machine images. The store of software profiles 125 can be any storage capable of storing software. In one example, the store of software profiles 125 stores a single virtual machine image that can be configured by the scheduler 130 to mimic the performance of any destination device on the network. The store of software profiles 125 can store any number of distinct virtual machine images that can be configured to simulate the performance of any destination devices when processed in one or more virtual machine(s) 120.

The processing of an object may occur within one or more virtual machine(s) 120, which may be provisioned with one or more software profiles. The software profile may be configured in response to configuration information provided by the scheduler 130, information extracted from the metadata associated with the object, and/or a default analysis software profile. Each software profile may include an operating system 121 and/or software applications 122. Each of the one or more virtual machine(s) 120 may be configured with monitoring logic 124, which in an alternative embodiment may configured as an aspect of the software profile. The monitoring logic 124 is configured to observe, capture and report information regarding run-time behavior of an object under analysis during processing within the virtual machine. During run-time, for example, a generated object may contain features undetected by the static analysis logic 105 due to obfuscation (e.g., by compilation, encryption, etc.,), the processing thereby exposing obfuscated features.

The monitoring logic 124 may be embedded as an aspect of the virtual machine 120 and/or integrated into the operation of the one or more applications 122 of the virtual machine. The application 122 may comprise at least one interpreter to process the suspicious object script and/or an object script generated by processing an object by the application. In some embodiments, the monitoring logic 124 intercepts the processing of an application 122 processing an object. The monitoring logic 124 is configured to detect the generation of a new object by the interpreter processing an object within the context of an application 122 in the virtual machine 120.

During processing in the one or more virtual machine(s) 120, monitoring logic 124 of the virtual machine are configured to identify generated objects (i.e. additional objects). The generation of additional objects may be monitored by monitoring signaling that is triggered from calls of an interpreter and/or operations conducted by the interpreter. The interpreter may be an application and/or operate within the context of an application. The signaling from the interpreter may be monitored through intercept points (sometimes referred to as "hooks") to certain software calls (e.g., Application Programming Interface "API" call, library, procedure, function, or system call). The operations of the interpreter may be monitored through another type of intercept point (herein sometimes referred to as "instrumentation") in code closely operating with the interpreter or within the interpreter itself to detect a certain type of activity, which may include an activity prompting a particular software call. In some embodiments, the monitoring logic may be embodied as hooks or instrumentation associated with calls to an interpreter's just-in-time (JIT) compiler. By intercepting calls to the compiler of the interpreter, the monitoring logic may detect the generation of new code (i.e., generated object). For example, monitoring logic may intercept calls from an interpreter's compiler when a call is executed to generate new machine code for processing by a processor. The generated object may be provided, by the monitoring logic 124, to the AST generator 160, the event database and logic 150, and/or the correlation engine 170 for further processing. The observed and captured run-time behavior information as well as effects on the virtual machine, otherwise known as features, along with related metadata may be provided to the event database and logic 150 for further processing.

An event database and logic 150 may receive the monitored and detected features from the one or more virtual machine(s) 120. The event database and logic 150 is configured to detect anomalous activity (e.g., unexpected, abnormal, etc.) for reporting to the correlation engine 170. In some embodiments, the event database and logic 150 may be implemented as separate modules, e.g. an event database and an event logic. Herein, the event database and logic is described as a single module with an event database aspect and an event logic aspect. The received features are processed by the event logic aspect of the event database and logic 150 in combination with the data stored in the event database aspect of the event database and logic. The event database aspect of the event database and logic 150 may contain predefined definitions and/or rules that indicate malicious, anomalous or unwanted behaviors. For example, during the processing of a generated object, a user input interface may be created to accept information, e.g., a username and password. The monitoring logic would generate an event in response to the user input interface creation and provide to the event database and logic 150 to associate with the relevant feature, the feature provided for correlation to the correlation engine 170. These predefined definitions and/or rules may be continuously updated via software updates received via the cloud computing services (not shown) and/or via a network administrator. In some embodiments the event database and logic 150 may receive features from the one or more virtual machine(s) 120 when the monitoring logic identifies a generated object in the virtual machine. Similarly, the AST generator 160 receives the generated object when the one or more virtual machine(s) 120 complete an object generation routine.

The AST generator 160 receives each generated object from the one or more virtual machines 120. Subsequently, the AST generator 160 generates an AST from the generated object. Finally, the AST generator 160 may remove superfluous parameters from the AST, which may include, but is not limited or restricted to, removing hardcoded parameters or variables from the AST, determining and removing portions of the AST that are not accessible (e.g., dead code, construed as software code that does not affect the results of running the software code) and/or determining and removing infinite loops within the AST. In one embodiment, the AST generator 160 may comprise a compiler. In a second embodiment, the AST generator 160 may comprise one or more software libraries (e.g., open source libraries) configured to generate an AST.

The correlation engine 170 receives the AST from the AST generator 160 and correlates the AST with one or more entries in a database (not shown). Each entry in the database represents an AST of a labelled sample (e.g. benign, malicious, suspicious, etc.). The result of a correlation of the AST and an entry in the database is a score (e.g., a percentage, a numerical value, a weighted numerical value) that represents how similar the AST is to the AST of the labelled sample represented by the database entry. In one embodiment, each database entry takes the form of a hash value (e.g., a MD5 hash value, a secure hash algorithm (SHA-1) hash value, etc.). In such an embodiment, the correlation logic 170 computes a hash value representing the AST and performs the correlation of hash values. In other embodiments, other representations may be used in place of hash values. Additionally, the correlations between the AST and the entries in the database may involve, for each entire AST or may be of one or more portions of the AST.

In one embodiment, machine learning may be utilized to determine if a generated AST is "similar" to a sample stored in a labelled cluster of stored objects. Upon detection of a "similar" AST, the suspect object may be associated with the cluster and correlated based on the level of similarity with the cluster. For example, the suspect object may be classified as malware, non-malware, or with an unknown status based on the classification of objects within the cluster.

The correlation logic 170 may generate additional correlations based on metadata associated with the received generated object combined with the AST associated with each received generated object. In some embodiments, the metadata associated each of the received generated object may relate to a timestamp indicating when the code was generated. The timestamp may be used by the correlation logic to arrange a sequence of generated objects and the associated ASTs. A correlation with maliciousness may be generated correlating the similarity of generated ASTs with patterns of labelled ASTs. Similarly, a correlation with maliciousness may be generated by correlating sequences of generated ASTs (coupled with the original object) with labelled sequences of ASTs. In other embodiments the sequence of generated object may be identified using an incremental sequence identifier. In some embodiments the metadata may include a timestamp associated with the time when the generated object was processed in the virtual machine, thereby generating a sequence for AST similarity analysis based processing of the generated objects. The similarity analysis, conducted by the correlation engine 170 of ASTs may comprise an algorithm to determine the syntactical distance between AST features of the object and features of labelled objects. An exemplary algorithm that may be used in some embodiments is a variation of the "Levenshtein distance," modified to determine the distance in number of operations needed to find the syntactical difference between an AST features and the features from a labelled set.

The correlation logic 170 provides information associated with the correlation of the object (and the generated object produced by processing the object) to the classification engine 180. The provided information may include a measure of the similarity of the generated AST with a labelled set of ASTs, the associated likelihood of maliciousness associated with each feature, a likelihood of maliciousness associated with the sequence of objects generated by the processing of the object, and/or the score of the correlation of AST and generated object coupled with the score associated with the object processed. The classification engine 180 is configured to provide the classification information to the reporting engine 190. In some embodiments, the classification engine may provide information to the reporting engine only if the processed object is classified as malicious.

The reporting engine 190 is adapted to receive information from the classifying engine 180 and generate alerts that identify to a network administrator and/or an expert network analyst the likelihood of maliciousness of the processed object. Other additional information regarding the malicious object may optionally be included in the alerts. For example, the targeted applications associated with the malicious object may be included.

B. Generated Malware Detection Methodology

Figure 2:
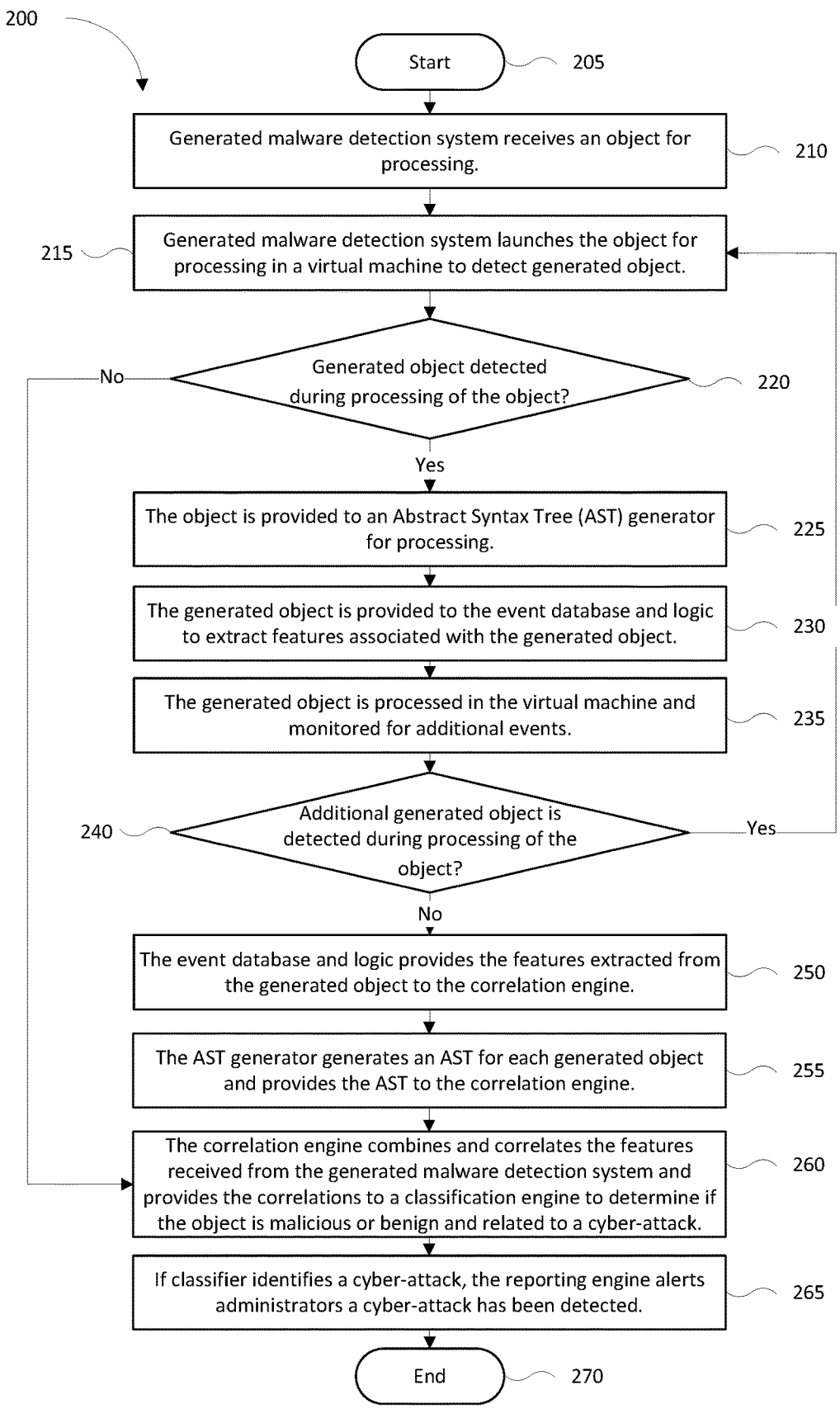
FIG. 2 is a flowchart illustrating an exemplary method for detecting and reporting if objects generated while processing an object in a virtual machine of the generated malware detection system of FIG. 1, represents malware.

Referring now to FIG. 2, a flowchart, illustrating an exemplary method for monitoring suspicious content being processed using a virtual machine and determining if the suspicious content may be used to execute a malicious attack. Each block illustrated in FIG. 2 represents an operation performed in the method 200 of detecting malicious attacks with the generated malware detection system 100. The method 200 starts at step 205 and proceeds to step 210 wherein the generated malware detection system 100 receives an object for processing. The object received by the system for processing may represent, in some embodiments, network content (or a subset of the traffic) received by the system for processing via the network interface. In some embodiments the object received may represent digital content not received via the network interface as network traffic (e.g. an electronic message, etc.). In some embodiments of the process, the object received by the generated malware detection system may be limited to objects that are identified as suspicious (bearing one or more features of maliciousness, though not determined to exceed a maliciousness classification threshold) by a separate system, such as a malware detection system 105, coordinating with the system described herein.

In step 215, the generated malware detection system launches the object (begins processing the received object) in a virtual machine 120 of the generated malware detection system 100. In one embodiment, the processing of the object includes launching the object within a virtual machine 120, wherein one or more processes (a process represents an instance of an application 122) are initiated and while the object is being processed, the processed object launches an additional process within the virtual machine to execute generated object. The application process may contain a monitoring logic 124, the monitoring logic configured to detect behavioral features of the object during processing. The virtual machine 120 is configured, using the monitoring logic 124 (as described above), to monitor the processing of objects within the virtual machine and determine if additional objects are generated by a process within the virtual machine.

During step 220, the monitoring logic 124 of the virtual machine 120 determines, during processing of an object, if a new object is generated by the process. The generated object may reflect additional code generated by the object in the same process as the object generated in another process. The additional code may be processed in the same application as the generating object, or it may run in a separate application instance. For example, the first object processed by the system may be a JavaScript® object processing in a web browser (e.g. Google® Chrome®) and during processing may generate an additional Silverlight object which is to be processed in another browser (e.g. Microsoft® Internet Explorer®). The generated object (i.e. the Silverlight object) would be identified by the monitoring logic 124 and the new process launched for processing the generated object would be monitored by the monitoring logic. If no additional object is identified by the monitoring logic 124 of the virtual machine 120, the process ends at step 270 without a classification of maliciousness as the first object to be processed did not generate an additional object, where the first object is seemingly benign.

If, in step 220, an additional object is determined to have been generated in response to the processing of the first object, the virtual machine 120 provides the generated object to the event database and logic 150 and the AST generator 160 while continuing to process the object (including instructions to process the generated object). In some embodiments, any additional restrictions to processing the object in the virtual machine are modified to permit further processing of the generated object (e.g. if the object to be processed was allotted two minutes for processing and the generation of objects is identified, the analysis timer may be reset to permit an additional two minutes for processing). The generated object may continue to generate objects recursively. In some embodiments a limit may be set on the total available processing time for subsequent processing of the object. In some embodiments the limit placed on processing a generated object may be limited to the number generated object segments processed, dynamically limited based on the processing needs as determined by the scheduler 130 and/or "factory-set". If an additional object is not detected to have been generated in step 220, the process continues in step 260 by correlating the identified features (identified during processing of the object by the dynamic analysis logic 110 and optionally the static analysis logic 105) for classification of the object as malicious or benign.

In step 225, the generated object is provided to an abstract syntax tree (AST) generator 160 for processing and construction of a generated AST. The AST generated for each object is analyzed to extract a set of AST features. The AST features of each object may be provided to the correlation engine 170 for correlation with known malware. In alternative embodiments, the AST generator may further comprise an AST feature analysis logic, the logic responsible for correlating the AST features with the AST features of known malware. The correlation with AST features would then be provided to the correlation engine 170 for correlation with other detected features of the object and classified as "malicious", "benign", or "suspicious". In some embodiments the AST generator may also provide the generated object, associated with the AST, to the correlation engine for correlation with maliciousness.

During step 230, the event database and logic 150 receives the generated object from the virtual machine and processes the object using a set of heuristics stored in the event database aspect of the event database and logic. The event logic aspect, of the event database and logic 150, processes the received code using the heuristics stored in the event database to identify relevant features. In some embodiments the heuristics may not be stored as rules but as data stored in the database. The features identified during step 230 may be provided to the correlation engine in step 250. The features provided to the correlation engine may be combined with a score associated with maliciousness of each feature.

In step 235, the generated object created by processing the object may continue to be processed until the generated object is called. The generated object may run in the same process as the calling code or in another process. The monitoring logic of the virtual machine may be configured to monitor the features of the generated object and further determine, in step 240, if the content is generating additional objects. If in step 240, the virtual machine monitoring logic identifies additional objects being generated, the process returns to step 215 (described above) to continue processing the newly generated object. In some embodiments the system may return to step 215 and continue with the analysis in step 250, the system functions operating in parallel. If no additional generated object is identified in step 240, the process continues to step 250.

The process continues in step 250 where the event database and logic 150 provides the features extracted from the generated object to the correlation engine for correlation with known malicious samples. Similarly, in step 255 the AST generator provides the rendered AST (or AST features extracted from the AST of the generated object) for each generated object to the correlation engine for correlation with labelled samples and to determine maliciousness by a classification engine 180.

In step 260 the correlation engine combines and correlates the features received from the event database and logic 150 and the AST generator 160 for correlation. As described above, the correlation engine 170 generates a score associated with the received features and provides the score to the classification engine 180. The correlation engine 170 may correlate the features received with known behaviors and characteristics of benign and malicious objects. The correlation engine 170 may generate a score based on each correlation of an observed feature with known behaviors and characteristics of benign and malicious objects. The classification engine 180 may utilize the scores generated by the classification engine 170 to classify the object as malicious if it exceeds a threshold. The threshold may be fixed or dynamic. The maliciousness threshold used by the classification engine to determine if the object is malicious may be "factory-set," "user-set," and/or modified based on the features of the object analyzed.

The process continues in step 265 wherein, the reporting engine 190 receives information from the classification engine 180 and generates alerts issued via the communication interface 305 that identify to an administrator (or an expert network analyst) the likelihood of cyber-attack originating from the object processed by the one or more virtual machine(s) 120. Additional information regarding the malicious object may optionally be included in the alerts. For example, additional reported information may contain, in part, typical behaviors associated with the malware, and/or users that may be targeted. The reporting engine 190 may also provide connected network security systems with updated information regarding malicious attacks and their correlation with particular behaviors. In some embodiments, if the classification engine 180 does not determine the object is malicious the reporting engine 190 may alert a network administrator via an alert, while in alternative embodiments the reporting engine will not issue an alert. Once step 265 is complete, the generated malware detection procedure concludes at step 270.

FIG. 3 is an exemplary embodiment of a logical representation of the generated malware system 100 of FIG. 1. The generated malware detection system 100, in an embodiment may include a housing, which is made entirely or partially of a hardened material (e.g., hardened plastic, metal, glass, composite or any combination thereof) that protect circuitry within the housing, namely one or more processors 310 that are coupled to a communication interface 305 via a first transmission medium 307. The communication interface 305, in combination with a communication logic 320, enables communications with external network devices and/or other network appliances to receive updates for the generated malware detection system 100. According to one embodiment of the disclosure, the communication interface 305 may be implemented as a physical interface including one or more ports for wired connectors. Additionally, or in the alternative, the communication interface 305 may be implemented with one or more radio units for supporting wireless communications with other electronic devices. The communication interface logic 320 may include logic for performing operations of receiving and transmitting one or more objects via the communication interface 305 to enable communication between the generated malware detection system 100 and network devices via the a network (e.g., the internet) and/or cloud computing services.

The processor(s) 310 is further coupled to a persistent storage 315 via a second transmission medium 313. According to one embodiment of the disclosure, the persistent storage 315 may include, an optional static analysis logic 105 comprising an indicator scanner 106 and/or a heuristics engine 107, a dynamic analysis logic comprising one or more virtual machine(s) 120, a scheduler 130, an event database and logic 150, an AST generator 160, and a correlation engine 170, a classifying engine 180, a reporting engine 190, as well as the communication interface logic 320. Of course, when implemented as hardware, one or more of these logic units could be implemented separately from each other.

Figure 4:
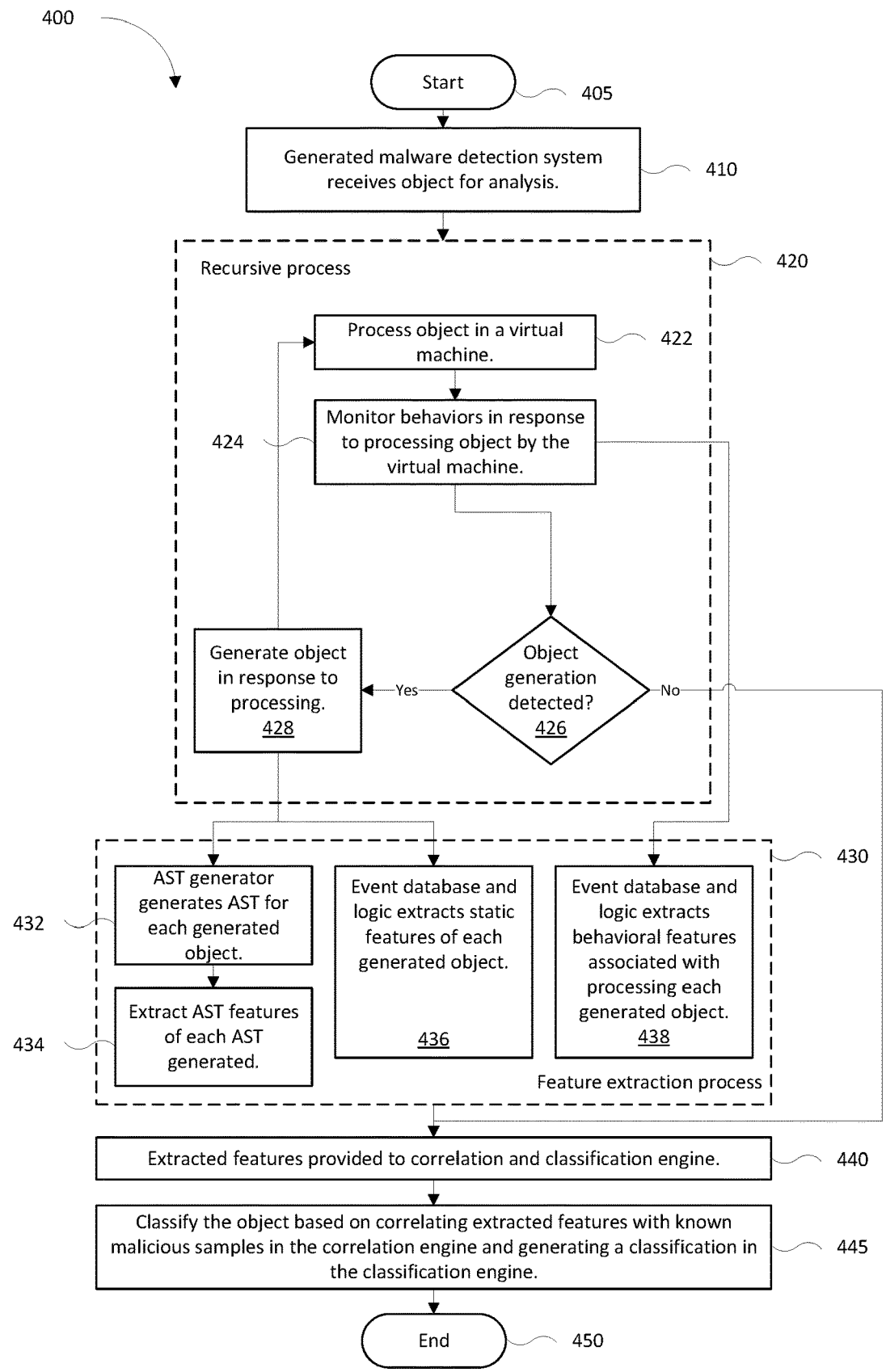
FIG. 4 is a flowchart illustrating an exemplary recursive generated malware detection method for detecting and reporting if generated objects represent malware, using the generated malware detection system of FIG. 1.

Referring now to FIG. 4, an exemplary flowchart illustrating the analysis process 400 of the generated malware detection system 100. The analysis process 400 starts with step 405 and proceeds to step 410 where the generated malware detection system 100 receives a suspicious object for processing from a locally or remotely located static analysis logic 105 where the object is determined to be suspicious (i.e. potentially malicious).

The suspicious object is analyzed by processing in the one or more virtual machines 120 of a dynamic analysis logic 110. In some embodiments, the dynamic analysis logic 110 may schedule the suspicious object for analysis using a scheduler 130. In some embodiments, the scheduler 130 may select a software profile (as described above) from a software profile store 125 to be used when processing the suspicious object in each of the one or more virtual machines 120. In step 420, the generated malware detection system 100 processes the suspicious object in what may be a recursive process. The processing of the suspicious object may recursively generate additional objects. The object processed may be either the suspicious, original, object received by the generated malware detection system 100 or a generated object (a new object generated dynamically by processing another object under analysis, for example, recursively). In step 422 the object is processed by the virtual machine 120 and its behavioral effect on the virtual machine is detected as behavioral features in step 424. During the monitoring of the object by the virtual machine 120, the monitoring logic 124 (described above) may intercept calls when the object attempts to generate a new object. During the monitoring of the processing of the object in the virtual machine 120, the monitored behaviors are provided to the event database and logic 150 for analysis. In step 438, the event database and logic 150 processes the received behaviors (each associated with the object or generated object that was being processed when it was monitored) with respect to suspicious patterns or behaviors, thereby extracting the features of the object. The features extracted by the event database and logic 150 in step 438 will be provided to and analyzed by the correlation engine 170 in step 440.

If the generation of a new object is detected by the monitoring logic 124 of the virtual machine 120, in step 426, the application 122 shall continue to step 428 whereby the virtual machine continues the processing (from the interception point identifying the generation of a new object) and generates the new object. The new object that is generated in step 428 is provided is processed by the virtual machine 120 when it is called by a process running in the virtual machine. The newly generated object may be run by the same application 122 as the original, calling object or in a separate application. When the object generated in step 428 is called for processing by the previous object, the recursive process 420 begins anew. The generated object created in step 428 is also provided to the feature extraction process of step 430. More specifically, the generated object created in step 428 is provided to an AST generator 160 and an event database and logic 150 for further processing of the generated object. In step 432, the AST generator 160 receives each generated object created in step 428 and generates an Abstract Syntax Tree (AST) associated with the object. The AST generated in step 432 is analyzed by the correlation engine 170 (as described above) to generate correlations with known malicious AST hallmarks and patterns in step 434. The extracted features of each AST created in step 434 are provided to the correlation engine 170 (as described above, the correlation engine 170 may be operationally combined with a classification engine 180). Similarly, the generated object received by the event database and logic 150 in step 436, is processed and characteristics of the object are extracted. The characteristics may include the object's formatting or patterns within the object.

In step 440 the correlation engine 170 receives the features extracted from the AST generator 160 (i.e. the AST features) and/or the event database and logic 150 (the event database and logic extracts both characteristics of the object and generated objects and behavioral information related to the processing of the processing of each object or generated object). The features, including the meta-information associated with the information (e.g. sequence of processing of each object and generated object, sequence of generated object AST, etc.) may be used by the correlation engine 170 to generate a probability of maliciousness associated with those features. The probability of maliciousness associated with each of the objects processed in the virtual machine 120 in step 440 are provided to the classification engine 180 in step 445 where the classification engine classifies the objects as either benign, suspicious, or malicious, based, at least in part, on their probability of maliciousness. The classification engine 180 may provide the classification to a reporting engine 190, the reporting engine, generating alerts in response to the received classification for a network security analyst. The process generated malware analysis process ends at step 450. In some embodiments, the correlation engine 170 and the classification engine 180 may be integrated into a single module or may operate as two separate modules.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A system to detect malware generated by an object, the system comprising:
   a storage device;
   one or more processors communicatively coupled to the storage device, the one or more processors configured to execute dynamic analysis logic, an Abstract Syntax Tree (AST) generator, a correlation engine, a classification engine and a reporting engine, wherein
      the dynamic analysis logic, stored in the storage device and configured with a monitoring logic, to process the object and identify features associated with the processing of the object, detect an object generated during the processing of the object, and provide the generated object to the AST generator and the correlation engine;
      the AST generator, stored in the storage device, being configured to receive the generated object, generate an AST representation of the generated object and remove one or more parameters from the AST representation prior to providing the AST representation to the correlation engine;
      the correlation engine, stored in the storage device, being configured to (i) receive the features generated during the processing of the object by the dynamic analysis logic and the AST representation and (ii) perform a correlation of at least the AST representation with a labeled set of one or more ASTs associated with known malicious objects, to generate a likelihood of maliciousness;
      the classification engine, stored in the storage device, being configured to receive from the correlation engine the likelihood of maliciousness associated with the generated object and the AST representation, and classifying the object as malicious in response to the correlation; and
      the reporting engine being configured to generate and issue alerts in response to the object being classified as malicious by the classification engine.

2. The system of claim 1, wherein the monitoring logic detects creation of the generated object by identifying the use of a virtual machine resource to generate the generated object.

3. The system of claim 1, wherein the AST generator comprises a compiler.

4. The system of claim 1, wherein the dynamic analysis logic includes one or more virtual machines configured to process the object to determine if one or more generated objects are created during processing.

5. The system of claim 4, wherein the correlation engine correlates a sequence comprising the object and one or more generated objects with a likelihood of maliciousness associated with the sequence and provides the likelihood of maliciousness to the classification engine, wherein the sequence indicated by a sequence identifier being part of metadata associated with the object or a generated object of the one or more generated objects.

6. The system of claim 5, wherein the sequence identifier is a timestamp associated with the generation of each generated object.

7. The system of claim 5, wherein the sequence identifier is a timestamp associated with the beginning of processing of each generated object.

8. The system of claim 1, further comprising reporting of the classification of the object via a communication interface, by issuing an alert associated with the object.

9. The system of claim 1, further comprising:
   the features associated with the processing of the object are received by the correlation engine, the features extracted by an event database and logic from events monitored by the monitoring logic;
   the correlation engine combining the features received from the event database and logic with features associated with the AST representation to generate a further correlation with maliciousness; and
   the further correlation with maliciousness provided to the classification engine.

10. The system of claim 1, wherein a scheduler terminates further processing by the virtual machine when processing time exceeds a specified duration.

11. The system of claim 10, wherein the scheduler modifies the specified duration for processing by the virtual machine in response to the generation of the generated object.

12. The system of claim 1, wherein the correlation engine determines a likelihood of maliciousness for the AST representation of each generated object in response to a similarity analysis, including (i) performing a fuzzy hash to generate a hash list, and (ii) applying one or more similarity checks to one or more entries in the hash list.

13. The system of claim 5, wherein the correlation engine determines a likelihood of maliciousness for the sequence of AST representations of the generated object in response to a similarity analysis, including (i) performing a fuzzy hash to generate a hash list, and (ii) applying one or more similarity checks to one or more entries in the hash list.

14. The system of claim 1, wherein the dynamic analysis logic is configured to process and monitor the behavior of objects using one or more virtual machines configured with the monitoring logic.

15. The system of claim 1, wherein the AST generator is configured to extract AST features from the AST representation of the generated object and provide the extract AST features to the correlation engine.

16. A computerized method for detecting a generated malware cyber-attack, the method comprising:
   monitoring the processing of a first object in a virtual machine of a malware detection system; and
   responsive to detecting a second object generated during processing of the first object by an application operating within the virtual machine, where the second object is different than the first object,
      providing the generated second object to an Abstract Syntax Tree (AST) generator;
      generating an AST representation by the AST generator for the received generated second object and providing the AST representation to a correlation engine;
      determining correlation results, by the correlation engine, based at least in part on the received AST representation and providing the correlation results to a classification engine; and classifying, by the classification engine, the first object as malicious in response to the received correlation results exceeding a maliciousness threshold.

17. The method of claim 16, wherein the correlation of the AST representation includes performing a similarity analysis on at least a portion of the received AST representation with respect to a set of one or more AST representations of known malicious objects to generate a similarity score indicating whether the first object is associated with malware.

18. The method of claim 17, wherein the correlation of the AST representation is performed on a sequence of AST representations associated with the generated second objects created during processing of the first object in the virtual machine.

19. The method of claim 16, wherein the processing time for the first object in the virtual machine is limited by a scheduler.

20. The method of claim 16, wherein responsive to detecting the generation of the generated second object in the virtual machine, the processing time is modified by the scheduler.

21. The method of claim 16, further comprising generating a report related to the maliciousness of the first object and issuing an alert by the reporting engine in response to a classification by the classification engine.

22. The method of claim 16, further comprising the correlation engine:
   extracting features of the generated second object;
   generating a correlation with maliciousness of the extracted features by the correlation engine; and
   providing the correlation associated with the extracted features to the classification engine.

* * * * *